Oct. 23, 1951
J. L. RUSSELL
2,572,668
ECHO DISTANCE MEASURING CIRCUIT
Filed Feb. 3, 1950
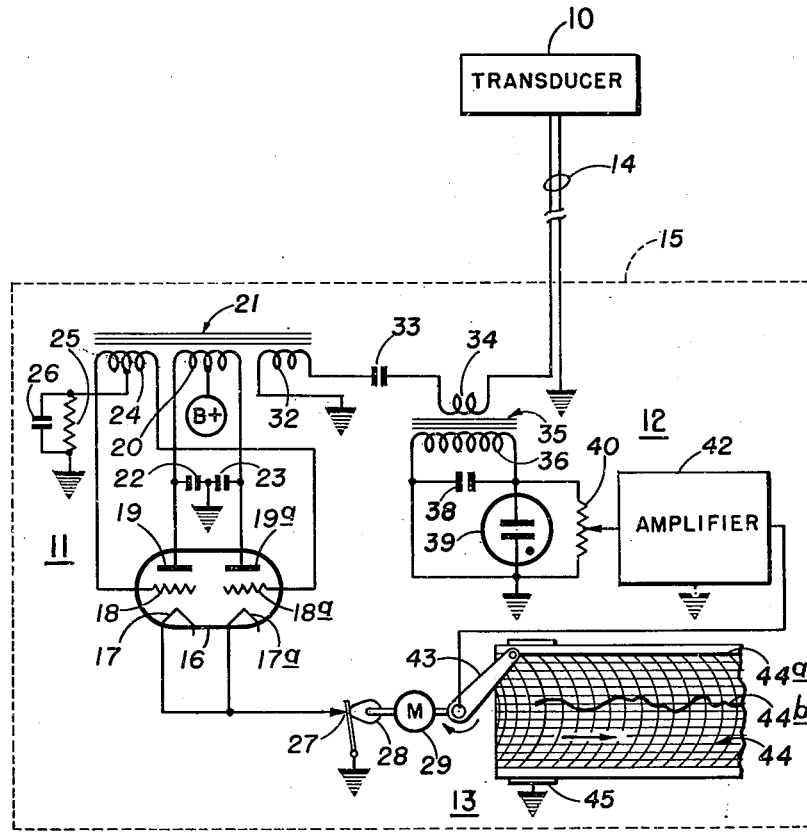
INVENTOR.
JAMES L. RUSSELL
BY
ATTORNEY Patented Oct. 23, 1951

2,572,668

UNITED STATES PATENT OFFICE 2,572,668

ECHO DISTANCE MEASURING CIRCUIT

James L. Russell, Sun Valley, Calif., assignor to Bendix Aviation Corporation, South Bend, Ind., a corporation of Delaware Application February 3, 1950, Serial No. 142,333

2 Claims. (Cl. 177—386)

This invention relates to distance measuring systems of the type in which a traveling wave is transmitted from a reference point and the echo thereof from a distant object is received and caused to produce an indication, the time elapsing between the transmission of the wave and the receipt of the echo being a measure of the distance. Such systems are well known and may use electromagnetic waves, such as radio, or compressional waves of sonic or supersonic frequency in air, water or other mediums.

An object of the invention is to provide a simple and practicable circuit for reducing the effect on the echo-receiving portion of the system of the transmitted waves, which are much more powerful than the returning echoes.

Another object is to provide a simple and practicable circuit whereby a single transducer can be permanently connected to both the transmitter and the receiver wtihout overloading the receiver or losing appreciable energy therein during transmission, and without losing echo signal energy in the transmitter during reception.

Other more specific objects and features of the invention will become apparent from the description to follow.

The present invention represents an improvement in and refinement of the circuit disclosed in my pending application Serial No. 112,107, filed August 24, 1949 for an Echo Distance Measuring Circuit. In the circuit of the prior application, the transmitter, receiver and transducer are connected in series with each other, and a gaseous discharge device such as a neon lamp is shunted across the receiver. The discharge device breaks down in response to the high transmitting potential, providing a low impedance path past the receiver to the transducer, so that the series connection does not materially reduce the power delivered by the transmitter to the transducer. However, the weak signals produced in the transducer by received echoes have to pass through the transmitter to get to the receiver and are somewhat attenuated by the impedance of the transmitter.

The present invention resides essentially in the addition to the series circuit of the prior application of a condenser of such value as to balance the reactance of the transmitter presented to the series circuit at the signal frequency. The impedance that the transmitter presents in the series circuit is substantially an inductive reactance when the transmitter is not transmitting, and is largely neutralized by the series condenser, so that substantially the full potential developed by the transducer in response to echoes is applied to the receiver. It is found that the addition of the series condenser does not materially affect the power applied by the transmitter to the transducer one way or the other, but by increasing the response to received signals substantially increases the effective range.

A full understanding of the invention may be had from the following detailed description, read in connection with the drawing, in which the single figure constitutes a schematic circuit diagram of a depth sounding system incorporating the invention.

The system comprises, as essential elements: a transducer 10, a transmitter 11, a receiver 12 and an indicator or recorder 13.

The transducer 10 may be of any known type, its exact characteristics depending upon the condition to be met. Thus it might be of the magnetic, piezocrystal, or magnetostriction type, for converting electrical waves into compressional waves, and vice versa, for signaling through a medium such as air, water, or the earth, or it might be an antenna for converting electrical waves into electromagnetic waves and vice versa where conditions are such, as in aircraft altimeters, that electromagnetic waves are desirable.

The transducer 10 is usually located at a distance from the remainder of the apparatus, the latter being located at a single point and shown as enclosed in a housing 15. It is desirable, in order to obtain high efficiency, that the transducer 10 have substantially a pure resistive impedance at the signal frequency, and the transmission line 14 should present a resistive impedance to the apparatus within the dotted rectangle 15.

As shown in the drawing, the transmitter 11 comprises a double triode tube 16 having cathodes 17 and 17a, control grids 18 and 18a, and anodes 19 and 19a. The two anodes 19 and 19a are connected to the opposite ends of the primary winding 20 of a transformer 21, and the mid tap of the winding 20 is connected to the B plus terminal of a conventional power supply. The primary winding 20 is tuned to the signal frequency by a pair of series condensers 22 and 23 which are connected at their common junction to ground. The grids 18 and 18a are connected to the opposite ends of a secondary winding 24 of the transformer, and a mid tap on this winding is connected through a grid resistor 25, shunted by a condenser 26, to ground. The winding 24 is so poled with respect to the winding 20 as to energize the grids 18 and 18a in positive feed back relation and cause the circuit to oscillate when the tube is energized. Such energization is produced by connecting the cathodes 17 and 17a to ground (the negative terminal of the B supply) by a switch or key 27 which is periodically closed by a cam 28 driven by a motor 29 that drives the recorder 13. The cam 28 closes the key 27 only for a short interval during each cycle, and during the remainder of the cycle the space current circuits of the tubes 16 are opened, stopping oscillations in the oscillatory circuit consisting of the transformer winding 20 and the condensers 22 and 23, and substantially completely unloading the oscillatory circuit so that it presents a very high impedance at the signal frequency. Since the secondary winding 24 is connected only to the grids 18 and 18a, this winding is also open-circuited when the space currents in the tube 16 cease, so that it offers no loading.

The transformer 21 has another secondary winding 32 that is connected in series with a condenser 33, the primary winding 34 of a receiving transformer 35 and the transmission line 14 leading to the transducer 10.

The condenser 33 is of such capacity as to balance the inductance of the transformer winding 32 of the transformer 21 when the other two windings 20 and 24 respectively thereof are unloaded. As previously pointed out, these windings 20 and 24 are unloaded during non-transmitting periods when the space current paths of the tube 16 are opened at the key 27.

The secondary winding 36 of the receiving transformer 35 is shunted by a tuning condenser 38 which tunes it to the signal frequency, and by a discharge device 39, and by a potentiometer winding 40, from which potentials are applied to the input of an amplifier 42, the output of which is connected to the recording arm 43 of the recorder 13. The recording arm 43, which is rotated by the motor 29, carries a stylus which is moved over a slowly moving record tape 44 of electrically sensitive paper which is marked in response to an electrical discharge therethrough. The mechanism for moving the paper tape may be conventional and is not illustrated. The paper is shown moving over a plate 45 which is grounded to complete a circuit from the stylus through the paper.

The discharge device 39 may be a neon lamp that ionizes and breaks down at a voltage substantially lower than that applied thereto by the transformer 35 when the transmitter 11 is energized. When the device 39 breaks down it becomes substantially a short circuit, the effect of which is applied through the transformer 35 to the primary winding 34 thereof so that substantially all of the power generated by the transmitter 11 and applied to the transformer winding 32 is applied through the transmission line 14 to the transducer 10, to strongly energize the latter and send out powerful traveling waves.

However, during reception of echo signals, the potentials applied to the discharge device 39 are insufficient to cause it to break down, so that it has substantially infinite impedance, and the full potential developed across the oscillatory circuit consisting of the transformer winding 36 and the condenser 38 is applied to the potentiometer 40 and therefrom to the amplifier 42.

Although the transformer 21 is designed to provide close coupling between the windings 24, 20 and 32, the winding 32 presents a relatively high inductive reactance during non-transmitting intervals when the tube 16 is non-conductive. It has been found that without the condenser 33 the inductive reactance of the winding 32 is sufficient to markedly reduce the strength of received signals from the transducer 10, which can reach the primary winding 34 of the receiving transformer only by flowing through the winding 32. However, by providing the condenser 33 in series with the winding 32 for tuning the latter at the signal frequency, the reactive impedance of the winding 32 is in effect eliminated from the series circuit, and the strength of the received signals applied to the receiving transformer 35 is greatly increased. In actual tests on the circuit in a depth recorder, the range with the condenser 33 was three times greater than without the condenser.

During operation, whenever a signal is transmitted, the discharge device 39 breaks down to substantially reduce the potential developed across the potentiometer 40 in response to transmitted signals. However enough potential is applied to the amplifier 42 to cause the stylus of the recorder 13 to produce a mark on the record 44 each time the key 27 is closed. Successive marks produce a base line 44a on the record. During the time required for a pulse generated in the transducer 10 to travel to a distant object and be reflected back to the transducer, the arm 43 travels across the chart 44, and the energization of the stylus in response to the received echo produces a second mark spaced a distance from the base line 44a that is proportional to the distance from the transducer to the reflecting surface. These successive marks produce a curve 44b that constitutes a record of depth in the case of a depth sounder.

As previously stated, the range of the circuit is materially extended by the introduction of the condenser 33 to neutralize the inductive impedance of the transmitting winding 32 during receiving intervals, the increase in strength of received signals applied to the receiving transformer 35 being obtained without any material decrease in the strength of the transmitted signals applied to the transducer 10.

Although for the purpose of explaining the invention, a particular embodiment thereof has been shown and described, obvious modifications will occur to a person skilled in the art, and I do not desire to be limited to the exact details shown and described. It is to be particularly understood that the exact transmitter circuit shown is not essential in the practice of the invention, the only essential in this respect being that the transmitter include an output transformer having a secondary winding connected in series with the receiver and transducer, and having a primary winding that is unloaded during reception.

I claim:

1. An echo distance measuring system comprising: a transducer and a transmission line connected thereto at one end, the input impedance of the other end of said transmission line being substantially non-reactive at a signal frequency; a transmitter; a receiver having bridged across its input end a parallel oscillatory circuit tuned to said signal frequency and shunted by a discharge device normally having a high impedance but breaking down to a low impedance in response to a potential above a critical value intermediate the potentials developed in said transducer in response to received echoes and the potentials produced by said transmitter, respectively; said transmitter comprising a transformer having primary and secondary windings, electronic tube means having a cathode and anode, a source of anode potential for producing a space current discharge through said tube, means connecting said primary winding in the space current path of said tube whereby said winding is loaded in response to flow of space current and unloaded in response to cessation of space current flow, and keying means for periodically initiating and stopping said space current; a condenser of size to resonate with said secondary winding at said signal frequency; and means connecting said secondary winding, said condenser and said receiving oscillatory circuit in series with each other and with said other end of said transmission line, whereby said secondary winding, said condenser, said receiving oscillatory circuit and said transmission line constitute a single current path.

2. A system according to claim 1 including capacitance means connected in shunt to said primary winding and forming therewith a closed oscillatory circuit tuned to said signal frequency.

JAMES L. RUSSELL.

REFERENCES CITED

The following references are of record in the file of this patent:

UNITED STATES PATENTS

| Number | Name | Date |
|---|---|---|
| 2,410,065 | Harrison | Oct. 29, 1946 |
| 2,400,796 | Watts et al. | May 21, 1946 |
| 2,449,358 | Zappocosta | Sept. 14, 1948 |

FOREIGN PATENTS

| Number | Country | Date |
|---|---|---|
| 402,828 | Great Britain | Dec. 11, 1933 |
| 453,512 | Great Britain | Sept. 14, 1936 |